(12) United States Patent
Kastler et al.

(10) Patent No.: US 12,095,064 B2
(45) Date of Patent: Sep. 17, 2024

(54) BATTERY MODULE

(71) Applicant: Raiffeisenlandesbank Oberösterreich Aktiengesellschaft, Linz (AT)

(72) Inventors: Helmut Kastler, Freistadt (AT); Philipp Kreisel, Freistadt (AT)

(73) Assignee: John Deere Electric Powertrain LLC, Moline, IL (US)

(*) Notice: Subject to any disclaimer, the term of this patent is extended or adjusted under 35 U.S.C. 154(b) by 452 days.

(21) Appl. No.: 17/598,260

(22) PCT Filed: Jan. 21, 2020

(86) PCT No.: PCT/AT2020/060014
§ 371 (c)(1),
(2) Date: Sep. 25, 2021

(87) PCT Pub. No.: WO2020/191419
PCT Pub. Date: Oct. 1, 2020

(65) Prior Publication Data
US 2022/0181717 A1    Jun. 9, 2022

(30) Foreign Application Priority Data
Mar. 26, 2019 (AT) .............................. A 50259/2019

(51) Int. Cl.
*H01M 10/6556* (2014.01)
*H01M 10/643* (2014.01)
(Continued)

(52) U.S. Cl.
CPC ..... *H01M 10/6556* (2015.04); *H01M 10/643* (2015.04); *H01M 50/213* (2021.01);
(Continued)

(58) Field of Classification Search
CPC .......... H01M 10/6556; H01M 10/643; H01M 50/30; H01M 50/242; H01M 50/213
See application file for complete search history.

(56) References Cited

U.S. PATENT DOCUMENTS 9,246,147 B2   1/2016   Kishii et al.
9,991,571 B2   6/2018   Grass et al.
(Continued)

FOREIGN PATENT DOCUMENTS

CN    108574073 A    9/2018
DE    102014112624 A1    3/2016
(Continued)

OTHER PUBLICATIONS

English-language Abstract for CN108574073, Sep. 25, 2018.
English-language Abstract for JP-H097564 A, Jan. 10, 1997.

*Primary Examiner* — Karie O'Neill Apicella
(74) *Attorney, Agent, or Firm* — Tiajoloff & Kelly LLP

(57) ABSTRACT

The invention relates to a battery module having with a main body (1) for accommodating individual battery cells (4) arranged in parallel with respect to a joining axis (2), which main body forms a flow channel (6) extending transversely to the joining axis (2) for a temperature-control fluid flowing directly against the cell shells of the battery cells (4). In order not only to reduce the risk of thermal damage to individual battery cells (4) during peak loads, but also to prevent the propagation of a chain reaction in the event of a thermal runaway fault, it is proposed that, for each battery cell (4), a burst protection sleeve (7, 8), which surrounds the battery cell (4) circumferentially with a clearance by forming an air gap (10), is mounted upstream and downstream of the flow channel (6) in the direction of the joining axis (2), wherein the flow channel (6) extends over a height of 28-60% of the battery cell (4) and each burst protection
(Continued)

Figure 1:
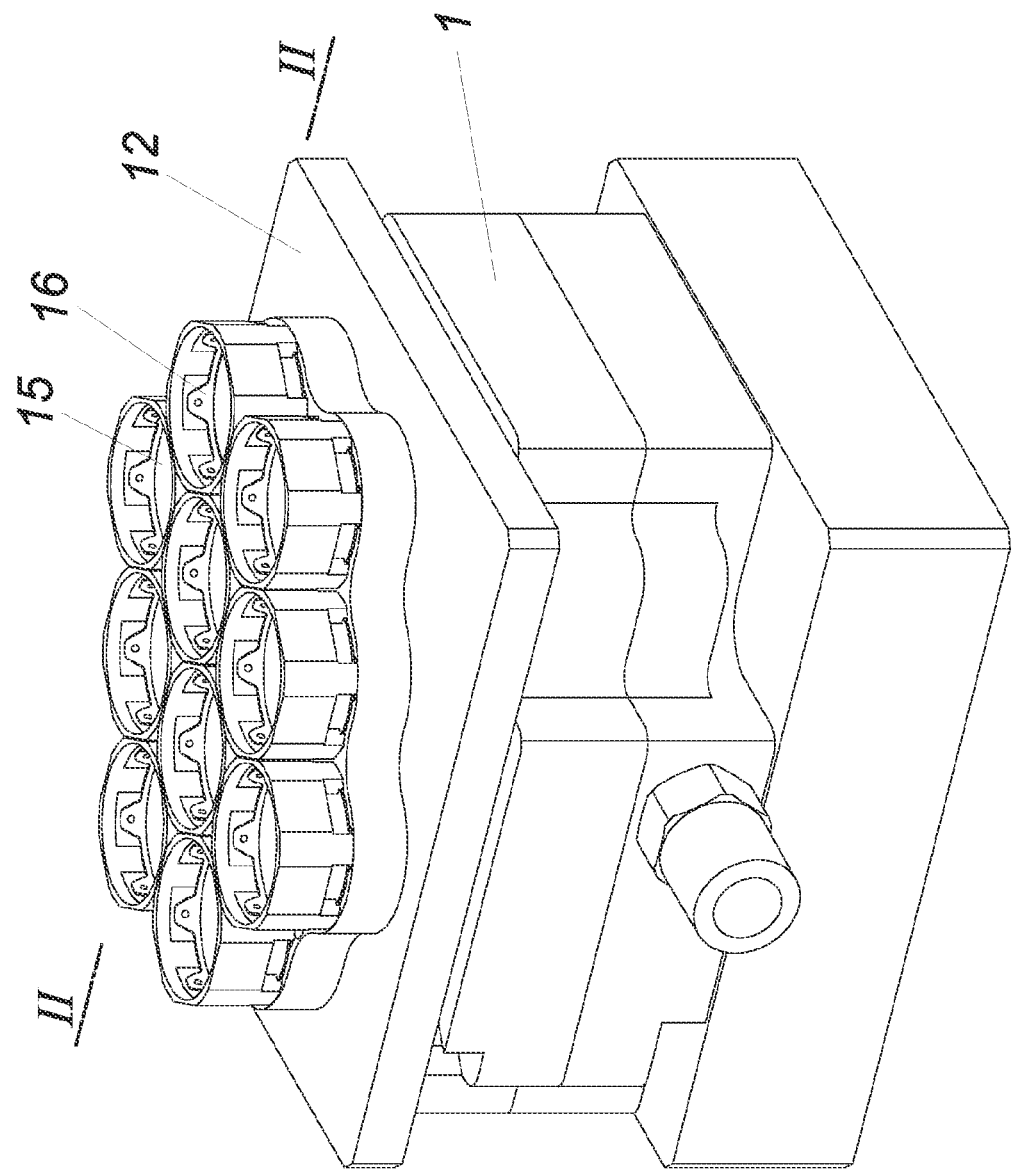

sleeve (7, 8) extends separately over a height of 20-36% of the battery cell (4).

13 Claims, 2 Drawing Sheets

(51) Int. Cl.
*H01M 50/213* (2021.01)
*H01M 50/242* (2021.01)
*H01M 50/289* (2021.01)
*H01M 50/30* (2021.01)
*H01M 50/503* (2021.01)
*H01M 50/509* (2021.01)

(52) U.S. Cl.
CPC ....... *H01M 50/242* (2021.01); *H01M 50/289* (2021.01); *H01M 50/30* (2021.01); *H01M 50/503* (2021.01); *H01M 50/509* (2021.01); *H01M 2200/00* (2013.01)

(56) References Cited

U.S. PATENT DOCUMENTS

| | | | |
|---|---|---|---|
| 10,347,954 B2 * | 7/2019 | Rief | ................. H01M 10/6235 |
| 10,483,606 B2 | 11/2019 | Kreisel et al. | |
| 10,529,960 B2 | 1/2020 | Yamashita et al. | |
| 2014/0154545 A1 | 6/2014 | Kishii et al. | |
| 2016/0064784 A1 | 3/2016 | Grass et al. | |
| 2016/0284143 A1 | 9/2016 | Rief et al. | |
| 2017/0373287 A1 | 12/2017 | Yamashita et al. | |
| 2018/0310074 A1 | 11/2018 | Kreisel et al. | |
| 2019/0140235 A1 | 5/2019 | Lindstrom et al. | |

FOREIGN PATENT DOCUMENTS

| | | |
|---|---|---|
| DE | 112013007555 T5 | 7/2016 |
| EP | 2738833 A1 | 6/2014 |
| JP | H-097564 A | 1/1997 |
| WO | 2017/067923 A1 | 4/2017 |
| WO | 2017/181283 A1 | 10/2017 |

* cited by examiner

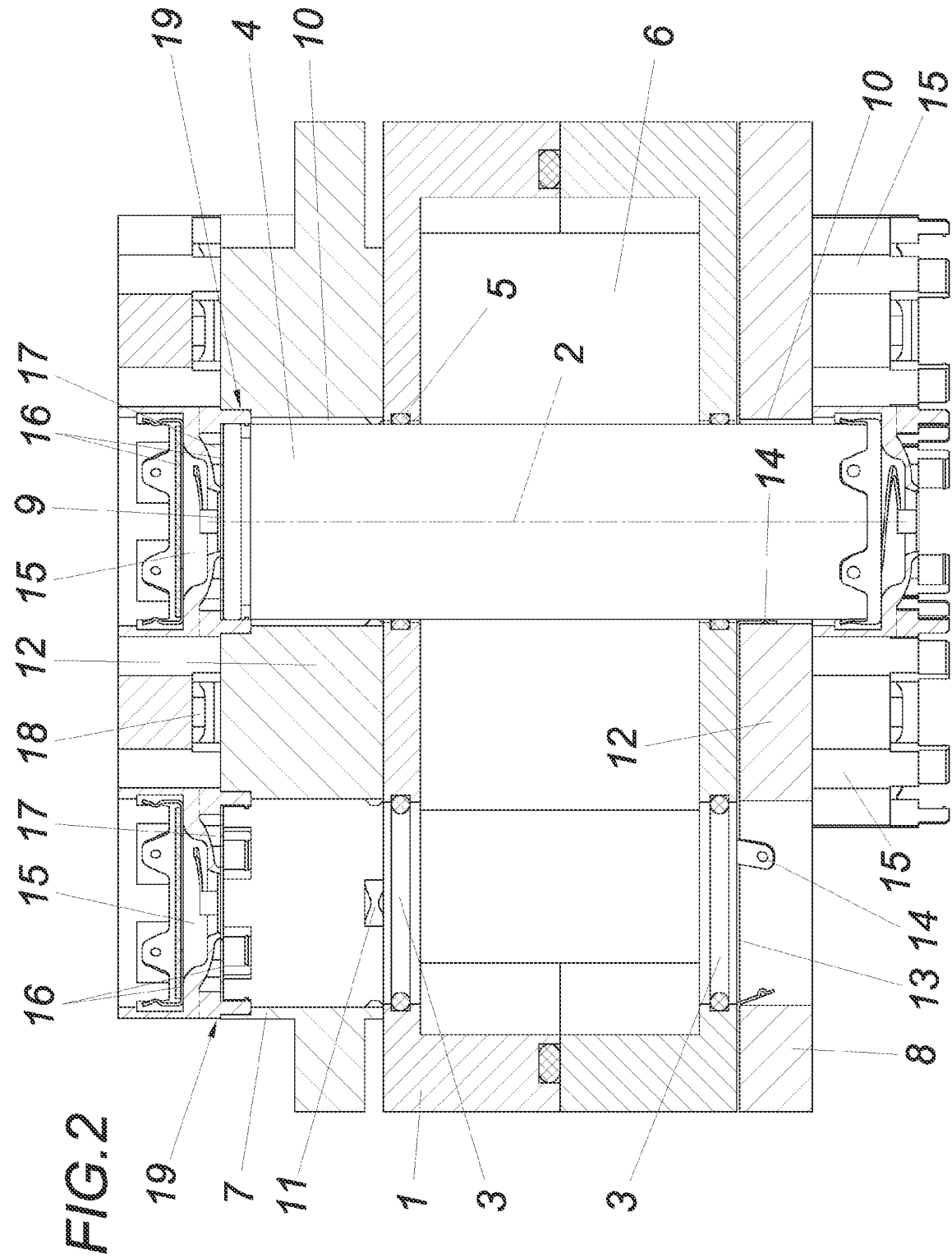

BATTERY MODULE

FIELD OF THE INVENTION

The invention relates to a battery module having a main body for accommodating individual battery cells arranged in parallel with respect to a joining axis, which main body forms a flow channel extending transversely to the joining axis for a temperature-control fluid flowing directly against the cell shells of the battery cells.

DESCRIPTION OF THE PRIOR ART

Prior art battery modules are known in which a temperature-control fluid flows directly onto the individual battery cells (WO2017067923). However, in the event of damage to individual battery cells, especially in the event of a thermal runaway, there is the problem that the battery cells burst along their shell. Due to the direct flow through a temperature-control fluid and the directly adjacent battery cells within the fluid flow channel, the risk of a chain reaction is increased.

To prevent chain reactions in battery cells that are not subject to direct flow, it has already been proposed (CN108574073A) to surround the individual cells with pressure-resistant sleeves to force bursting in the area of the cell terminals. However, the dis-advantage of this is that the sleeves result in a more sluggish temperature control of the battery cells, so that it is not possible to respond to short-term load peaks or thermal imbalances in the battery module, or only with a time delay, which increases the risk of damage to the battery cells contrary to the problem to be solved.

SUMMARY OF THE INVENTION

Based on a battery module of the type described at the beginning, it is thus the object of the invention not only to reduce the risk of thermal damage to individual battery cells during peak loads, but also to prevent the propagation of a chain reaction in the event of a thermal runaway fault.

The invention solves the problem in that the flow channel is preceded and followed in the direction of the joining axis by a burst protection sleeve for each battery cell, which surrounds the battery cell with clearance on the circumferential side, wherein the flow channel extends over a height of 28-60% of the battery cell and each burst protection sleeve extends separately over a height of 20-36% of the battery cell. Surprisingly, it has been shown that the bursting of cylindrical battery cells in the region of the cell shell can be prevented not only in the case of a sleeve extending over the entire cell shell height in favor of outgassing via the pole-side valves provided for this purpose, but also when two pole-side sections of 20-36% of the height of the battery cell in each case are enclosed by a burst protection sleeve. In a particularly preferred embodiment, the burst protection sleeves can each enclose a section of 28-30% of the height of the battery cell. It is not necessary for the burst protection sleeves to be directly adjacent to the cell poles. Although this measure reduces the usable area for a flow channel of a temperature-control fluid to a height of 28-60%, preferably 40-44%, of the battery cell, the reduced direct contact area between the temperature-control fluid, which may be air or a liquid, for example, can be compensated by a higher volume flow. In addition, the dynamic control behavior is improved because the total volume to be flowed through is reduced. In order to avoid mechanical overdetermination and thus rupture of the flow channel seal not only in view of the manufacturing tolerances of battery cells but also in the event of a fault, it is proposed in accordance with the invention that the burst protection sleeves enclose the battery cells with clearance, i.e. in such a way that an air gap remains between the burst protection sleeve and the shell of the enclosed battery cell. The possible expansion of the battery cell in the area of this air gap favors the mechanical behavior in the event of a thermal runaway, because uncritical expansions of the battery remain possible and do not already lead to damage of the bursting sleeves and subsequently of the entire battery module.

In order to facilitate the manufacture of the device according to the invention and to improve sealing of the flow channel, it is proposed that a group of burst protection sleeves form a burst protection separate from the main body. In this case, the burst protection sleeves can be connected via a support structure to form a burst protection, or the burst protection can be formed, for example, in the form of through-openings forming individual burst protection sleeves. These measures have the advantage that the individual battery cells can first be inserted into the main body, wherein the sealing of the flow channel is not impeded either by a mechanical overload or by damage to seals due to the burst protection sleeves. Only in a subsequent step can the burst protection sleeves be pushed onto the end sections of the battery cells projecting from the main body as burst protection separate from the main body.

In order to ensure that the air gaps between the burst protection sleeves and the battery cells provided in accordance with the invention are formed uniformly and, in the event of a burst protection separated from the main body, the relative position of the main body and burst protection can be specified, two, preferably three, centering lugs can be provided in a burst protection sleeve for aligning the battery cell within the burst protection sleeve. Such centering lugs also offer the advantage that mechanical loads on the battery module or the individual battery cells can be absorbed via the mechanically more stable centering lugs rather than via any seals of the main body that are in contact with the battery cells. This is particularly the case if the burst protection sleeves are formed integrally with the main body or if the burst protection and the main body are fixed in their relative position to each other.

A space-saving parallel connection of the individual battery cells, irrespective of their pole contacting, can be made possible in a simple manner if an electrically conductive parallel plate for connecting the battery cells in parallel is provided between the main body and the burst protection sleeves located on one side of the main body with respect to the joining axis. Such a parallel plate, whose exact positioning along the joining axis of the battery cells can vary depending on the embodiment of the invention, not only establishes the electrical contact for parallel connection of the individual battery cells, but also fulfills a mechanical stabilizing function. Nevertheless, due to the air gaps in the burst protection sleeves, the individual battery cells remain freely movable to a limited extent in the area of their poles transversely to the joining axis, so that the contacting and mechanical connection of several battery modules can be facilitated.

Although the individual battery cells can be electrically contacted in different ways, particularly advantageous conditions result if the parallel plate has contact tongues projecting into the air gap of at least one burst protection sleeve for frictional contacting of the battery cell enclosed by the burst protection sleeve. The spring-loaded contact tongues projecting into the air gap are not only supported against the burst protection sleeves, improving the contact pressure and thus the electrical contact, but also simultaneously allow alignment of the battery cells within the burst protection sleeves, so that any centering lugs in the burst protection sleeves can be omitted, at least on the side of the parallel plate.

A mechanically flexible contacting of the battery cells, which at the same time prevents the propagation of a single battery cell fault due to degassing, is obtained by providing pole attachments for the electrical contacting of individual battery cells, each of which has a hot gas channel opening into the area of the battery cell pole for discharging hot gas escaping from the battery cell. In the event of a thermal runaway or similar effects, the interaction of the burst protection sleeves and the pole attachments according to the invention ensures that hot gas escaping from the damaged battery cell on the pole side, i.e. in the area of the degassing valve provided for this purpose, is discharged in such a way that surrounding battery cells in the area of the cell jacket are not damaged. Hot gas is prevented from flowing into the flow channel not only by possible sealing between the flow channel and the burst protection sleeves, but also by the fact that the battery cell, which expands on the shell side before degassing, fills the air gap to the surrounding burst protection sleeve and thus seals it. To prevent a flow from adjacent battery cells opposite the pole of the outgassing battery cell, the hot gas channel can be curved by about 90° so that the hot gas is deflected laterally, i.e. transverse to the joining direction of the battery cell, and discharged.

In addition to diverting the large quantities of hot gas away from the damaged battery cell, discharging these hot gas quantities from the battery module is also relevant to safety, especially since any pressure peaks can also lead to structural damage to the battery module. It is therefore proposed that the individual pole attachments form a common discharge channel into which the hot gas channels open with their end sections opposite the battery cell poles. As a result of these measures, a discharge channel with a comparatively large cross-section extending over all pole attachments can prevent the occurrence of local pressure peaks, while the individual hot gas channels of smaller cross-section opening into the discharge channel reduce the risk of flowing into undamaged battery cells. To further reduce this risk, the individual hot gas ducts can be sealed off from the discharge duct with a fireguard which, in the event of a fault, is only breached due to pressure in the event of a battery cell outgassing.

The mounting of the battery cells in the battery module is subject to certain variations due to the manufacturing tolerances and designs of the battery cells, which are compensated for by surrounding the battery cells with clearance. However, this makes a mechanically flexible connection of serially connected battery cells necessary for the pole contacting. This can be realized by having the pole attachments each have two recesses for accommodating two battery cells to be contacted in series. Even if the battery cells move relative to the battery module and the stack, a constant electrical connection can be ensured because the contact is maintained by the pole attachments if the battery cells are tilted in the air gap of the burst protection sleeve.

The assembly of the burst protection sleeves with the pole attachments can be carried out more reliably if the burst protection sleeves form recesses for accommodating the pole attachments. This not only increases the mechanical stability of the battery module, but also prevents the electrical connection between two series-connected battery cells from becoming loose due to relative movements.

BRIEF DESCRIPTION OF THE INVENTION

In the drawing, the subject matter of the invention is shown by way of example, wherein:
FIG. 1 shows a perspective view of a battery module according to the invention and
FIG. 2 shows a section along line II-II of FIG. 1 on a larger scale, wherein one battery cell was removed for better illustration.

DETAILED DESCRIPTION OF THE PREFERRED EMBODIMENTS

A battery module according to the invention comprises a main body 1 which has through-openings 3 opposite each other with respect to a joining axis 2, through which individual battery cells 4 arranged parallel with respect to the joining axis 2 pass. The main body 1 is sealed off from the battery cells 4 in the region of the through-openings 3 by means of O-rings 5, so that a closed flow channel 6 is formed within which the cell envelopes of the battery cells 4 can be flowed against directly, i.e. directly by a temperature-control fluid.

With respect to the joining axis 2, burst protection sleeves 7, 8 adjoin the main body 1, whose flow channel 6 extends over a height of 28-60% of the height of the battery cells 4, preferably and as shown in FIG. 2 over a height of 40-44% of the height of the battery cells 4, on both sides. These burst protection sleeves 7, 8 extend over a height of 20-36% of the height of the battery cells 4, preferably over a height of 28-30% of the height of the battery cells 4. Although this is not mandatory, the burst protection sleeves 7 extend with respect to the joining axis 2 from the main body 1 to the cell poles 9. An air gap 10 is formed between each of the burst protection sleeves 7, 8 and the battery cells 4 in a normal operating state, which allows the battery cells 4 to expand slightly during normal operation.

In order to be able to align the battery cells 4 in a defined position relative to the burst protection sleeves 7, 8 despite this air gap 10, two, preferably three centering lugs 11 can be provided for each burst protection sleeve 7, 8.

Particularly favorable design conditions are obtained if at least one group of the burst protection sleeves 7, 8 forms a common burst protection 12 which is designed as a separate component from the main body 1.

In order to be able to make a particularly space-saving parallel contact between the battery cells in the embodiment shown, a parallel plate 13 can be provided, which is provided between the main body 1 and at least one of the burst protections 12. For electrical contacting of the battery cells 4 with the parallel plate 13 and for centering of the battery cells 4 within the burst protection sleeves 8, the parallel plate 13 can have contact tongues 14 for frictional contacting. This means that the centering lugs 11 on the burst protection sleeves 8 can be omitted as explained above.

The mounting of the battery cells 4 resulting from the design according to the invention allows limited free mobility of the cell poles 9 transversely to the joining axis 2. In order to be able to use this advantage in the context of several battery modules connected in series, pole attachments 15 are proposed which each have two recesses 16 for receiving two battery cells 4 to be contacted in series.

These pole attachments 15 can have hot gas channels 17 for discharging hot gas escaping from an outgassing valve located in the area of the cell poles 9, which in a particularly preferred embodiment open into a common discharge channel 18.

In order to be able to carry out a pre-alignment of the pole attachments 15 with respect to the burst protection sleeves 7, 8, the burst protection sleeves 7, 8 can have recesses 19 for accommodating the pole attachments 15.

The invention claimed is:

1. A battery module comprising:
    a main body accommodating individual battery cells arranged parallel to a joining axis and forming a flow channel extending transversely with respect to the joining axis for a temperature-control fluid flowing directly against cell shells of the battery cells,
    wherein each battery cell has a respective burst protection sleeve that is configured so as to direct bursting of the associated battery cell to one or more ends of the battery cell, that surrounds the battery cell circumferentially with a clearance by forming an air gap, and that is mounted upstream and downstream of the flow channel in the direction of the joining axis, and
    wherein the flow channel extends over a height of 28-60% of the battery cell and each burst protection sleeve extends separately over a height of 20-36% of the battery cell.

2. The battery module according to claim 1, wherein a group of the burst protection sleeves forms a burst protection separate from the main body.

3. The battery module according to one of claim 1, wherein two centering lugs are provided in one of the burst protection sleeves aligning the battery cell within the burst protection sleeve.

4. The battery module according to claim 1, wherein an electrically conductive parallel plate connecting the battery cells in parallel is provided between the main body and the burst protection sleeves located on a side of the main body with respect to the joining axis.

5. The battery module according to claim 4, wherein the parallel plate has contact tongues projecting into the air gap of at least one of the burst protection sleeves frictionally contacting the battery cell enclosed by the burst protection sleeve.

6. A battery module comprising:
    a main body accommodating individual battery cells arranged parallel to a joining axis and forming a flow channel extending transversely with respect to the joining axis for a temperature-control fluid flowing directly against cell shells of the battery cells,
    wherein, for each battery cell, a respective burst protection sleeve surrounds the battery cell circumferentially with a clearance by forming an air gap, and is mounted upstream and downstream of the flow channel in the direction of the joining axis, and
    wherein the flow channel extends over a height of 28-60% of the battery cell and each burst protection sleeve extends separately over a height of 20-36% of the battery cell; and
    wherein pole attachments making electrical contact with individual ones of the battery cells are provided, each of which has a hot gas channel opening into a region of a pole of the battery cell discharging hot gas emerging from the battery cell.

7. The battery module according to claim 6, wherein the pole attachments form a common discharge channel into which the hot gas channels open with end sections thereof opposite the battery cell poles.

8. The battery module according to claim 6, wherein the pole attachments each have two recesses accommodating two battery cells contacted in series.

9. The battery module according to claim 6, wherein the burst protection sleeves have recesses accommodating the pole attachments.

10. The battery module according to claim 1, wherein pole attachments making electrical contact with individual ones of the battery cells are provided, each of which has a hot gas channel opening into a region of a pole of the battery cell discharging hot gas emerging from the battery cell.

11. The battery module according to claim 10, wherein the pole attachments form a common discharge channel into which the hot gas channels open with end sections thereof opposite the battery cell poles.

12. The battery module according to claim 10, wherein the pole attachments each have two recesses accommodating two battery cells contacted in series.

13. The battery module according to claim 10, wherein the burst protection sleeves have recesses accommodating the pole attachments.

* * * * *